UNITED STATES PATENT OFFICE.

WILHELM HERZBERG AND WALTER BRUCK, OF SCHÖNEBERG, NEAR BERLIN, GERMANY, ASSIGNORS TO ACTIEN GESELLSCHAFT FÜR ANILIN FABRIKATION, OF BERLIN, GERMANY.

VAT DYES OF THE ANTHRAQUINONE SERIES.

1,008,906.  Specification of Letters Patent.  Patented Nov. 14, 1911.

No Drawing.  Application filed December 30, 1910.  Serial No. 600,111.

*To all whom it may concern:*

Be it known that we, WILHELM HERZBERG and WALTER BRUCK, subjects of the Emperor of Germany, residing at Schöneberg, near Berlin, Germany, our post-office addresses being Landshuterstrasse 24 and Neue Culmstrasse 5ª, respectively, Schöneberg, near Berlin, Germany, have invented certain new and useful Improvements in New Vat Dyes of the Anthraquinone Series, of which the following is a specification.

According to our present invention new valuable vat dyes of the anthraquinone series are obtained by brominating a so-called anthraquinone acridone which acridones on their part can be obtained by the action of a dehydrating agent upon an ortho-carboxyphenylamino-anthraquinone, obtaining thus for instance a body of the following formula:

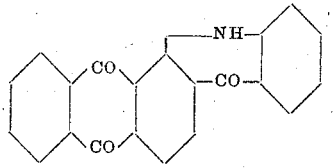

if starting from alpha-chloroanthraquinone and anthranilic acid. In order to brominate such an anthraquinone acridone according to our present invention one may proceed by one of the methods usual for this purpose; for instance, the parent material may be mixed with a suitable solvent, such as nitrobenzene, and acted upon with bromin while heating. The new dyes thus obtained produce on cotton from a vat containing a hydrosulfite and an alkali red to bluish red to blue tints which are clear and intense and possess a very good fastness.

The process relating to the present invention may also be carried out in the presence of a substance possessing a catalytic function, such as for instance iodin or the like.

The following example serves to illustrate our invention, the parts being by weight: 326 parts of alpha-beta-anthraquinone acridone (compare the above given formula) are dissolved in about 3300 parts of nitrobenzene while heating to about 150° C.; then while stirring 160 parts of bromin are added drop by drop. The reaction occurs with a constant evolution of hydrobromic acid; all the bromin having been introduced the temperature is gradually raised up to 200° C. in order to quickly eliminate the rest of hydrobromic acid. On cooling the bromanthraquinone acridone separates in the shape of brilliant copper-red small crystals. The new product thus obtained, if pulverized, forms a blue-red powder, which is nearly insoluble in alcohol and benzene; it is difficultly soluble in nitrobenzene, anilin and pyridin. In concentrated sulfuric acid it dissolves to an orange-yellow solution, which on the addition of ice separates blue-red flakes. The product gives with hydrosulfite and an alkali a violet vat from which is obtained on cotton an intense and clear red tint which possesses a very good fastness.

Our present invention is not limited to the foregoing example or to the details given therein. Thus, for instance, instead of a monobromo derivative there can also be obtained dibromo compounds of an anthraquinone acridone. Furthermore derivatives of the simplest anthraquinone acridone used in the above example may be employed, such as for instance alpha'-methyl-alpha-beta-anthraquinone acridone or di-alpha-beta-anthraquinone diacridone or the like. On the other side one can also proceed as follows: The parent material is dissolved in concentrated sulfuric acid, this solution poured on ice and a suitable paste is made by draining, which paste is then directly acted upon with bromin.

It is convenient to state that there is also another way to obtain the new products of our present invention. This way starts from a bromo derivative of anthranilic acid; this is condensed with a halogen anthraquinone to the corresponding anthraquinonylamino compound, which latter by the action of a dehydrating agent is transformed into the desired bromo-anthraquinone acridone.

Having now described our invention and the manner in which it may be performed what we claim is,—

1. As new vat dyestuffs the halogenated anthraquinone acridones which contain the halogen substituted in the benzene nuclei, which dyestuffs are insoluble in alcohol and benzene, difficultly soluble in nitrobenzene, soluble in concentrated sulfuric acid to a yellowish solution, and which dye cotton from the vat red to blue shades.

2. As new vat dyestuffs the halogenated anthraquinone acridones of the following constitution:

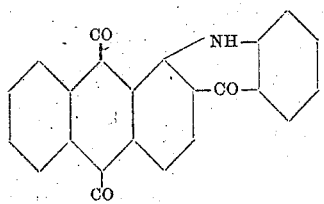

which contain the halogen substituted in the benzene nuclei, which dyestuffs are insoluble in alcohol and benzene, difficultly soluble in nitrobenzene, soluble in concentrated sulfuric acid to a yellowish solution, and which dye cotton from the vat red to blue shades.

3. As new vat dyestuffs the brominated anthraquinone-acridones which contain the bromin substituted in the benzene nuclei, which dyestuffs are insoluble in alcohol and benzene, difficultly soluble in nitrobenzene, soluble in concentrated sulfuric acid to a yellowish solution and which dye cotton from the vat red to blue shades.

4. As a new vat dye the brominated alpha-beta-anthraquinone acridone, which contains the bromin in the benzene nucleus and which may be obtained by acting on alpha-beta-anthraquinone acridone, dissolved in nitrobenzene, with bromin, this new dye if pulverized forming a blue-red powder which produces on cotton from a vat containing a hydrosulfite and an alkali an intense and clear red tint possessing a very good fastness, this new product being nearly insoluble in alcohol and benzene and difficultly soluble in nitrobenzene, anilin and pyridin to a blue-red solution, and which new dye dissolves in concentrated sulfuric acid to an orange-yellow solution which on the addition of ice separates blue-red flakes.

In testimony whereof we have hereunto set our hands in presence of two subscribing witnesses.

WILHELM HERZBERG.
WALTER BRUCK.

Witnesses:
WOLDEMAR HAUPT,
HENRY HASPER.